(12) United States Patent
Drescher et al.

(10) Patent No.: US 7,299,215 B2
(45) Date of Patent: Nov. 20, 2007

(54) CROSS-VALIDATION FOR NAIVE BAYES DATA MINING MODEL

(75) Inventors: Gary L. Drescher, Cambridge, MA (US); Pavani Kuntala, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 739 days.

(21) Appl. No.: 10/419,761

(22) Filed: Apr. 22, 2003

(65) Prior Publication Data

US 2003/0212851 A1 Nov. 13, 2003

Related U.S. Application Data

(60) Provisional application No. 60/379,110, filed on May 10, 2002.

(51) Int. Cl.
*G06F 17/00* (2006.01)
*G06N 5/00* (2006.01)
(52) U.S. Cl. .............................. 706/45; 706/14; 706/12
(58) Field of Classification Search .................. 706/45, 706/14, 12; 702/20; 700/31
See application file for complete search history.

(56) References Cited

U.S. PATENT DOCUMENTS

| | | | |
|---|---|---|---|
| 6,182,058 B1 * | 1/2001 | Kohavi | 706/45 |
| 6,278,464 B1 * | 8/2001 | Kohavi et al. | 345/440 |
| 6,460,049 B1 * | 10/2002 | Becker et al. | 707/104.1 |
| 6,807,491 B2 * | 10/2004 | Pavlovic et al. | 702/20 |
| 2003/0077586 A1 * | 4/2003 | Pavlovic et al. | 435/6 |
| 2003/0176931 A1 * | 9/2003 | Pednault et al. | 700/31 |

* cited by examiner

*Primary Examiner*—Joseph P Hirl
(74) *Attorney, Agent, or Firm*—Bingham McCutchen LLP

(57) ABSTRACT

A system, method, and computer program product provides a useful measure of the accuracy of a Naïve Bayes predictive model and reduced computational expense relative to conventional techniques. A method for measuring accuracy of a Naïve Bayes predictive model comprises the steps of receiving a training dataset comprising a plurality of rows of data, building a Naïve Bayes predictive model using the training dataset, for each of at least a portion of the plurality of rows of data in the training dataset incrementally untraining the Naïve Bayes predictive model using the row of data and determining an accuracy of the incrementally untrained Naïve Bayes predictive model, and determining an aggregate accuracy of the Naïve Bayes predictive model.

33 Claims, 5 Drawing Sheets

US 7,299,215 B2

CROSS-VALIDATION FOR NAIVE BAYES DATA MINING MODEL

CROSS-REFERENCE TO RELATED APPLICATIONS

The benefit of provisional application 60/379,110, filed May 10, 2002, under 35 U.S.C. § 119(e), is hereby claimed.

FIELD OF THE INVENTION

The present invention relates to a system, method, and computer program product for measuring accuracy of a Naïve Bayes predictive model using cross-validation.

BACKGROUND OF THE INVENTION

Data mining is a technique by which hidden patterns may be found in a group of data. True data mining doesn't just change the presentation of data, but actually discovers previously unknown relationships among the data. Data mining is typically implemented as software in association with database systems. Data mining includes several major steps. First, data mining models are generated by based on one or more data analysis algorithms. Initially, the models are "untrained", but are "trained" by processing training data and generating information that defines the model. The generated information is then deployed for use in data mining, for example, by providing predictions of future behavior or recommendations for actions to be taken based on specific past behavior.

One particularly useful type of data mining model is based on the Bayesian classification technique. Bayesian classifiers are statistical classifiers. They can predict class membership probabilities, such as the probability that a given sample belongs to a particular class. Bayesian classification is based on Bayes theorem. Studies comparing classification algorithms have found a simple Bayesian classifier known as the naive Bayesian classifier to be comparable in performance with decision tree and neural network classifiers. Bayesian classifiers have also exhibited high accuracy and speed when applied to large databases.

Users of a data mining predictive model benefit from knowing in advance how accurate a model's predictions will be. Cross-validation is one technique for measuring the accuracy of a predictive model. Leave-one-out cross-validation is an especially accurate special case of cross-validation, but it is ordinarily computationally expensive. Thus, a need arises for a technique by which leave-one-out cross-validation may be performed that provides a useful measure of the accuracy of a predictive model, but that provides reduced computational expense relative to conventional techniques.

SUMMARY OF THE INVENTION

The present invention is a system, method, and computer program product that provides a useful measure of the accuracy of a Naïve Bayes predictive model, but that provides reduced computational expense relative to conventional techniques.

In one embodiment of the present invention, a method for measuring accuracy of a Naïve Bayes predictive model comprises the steps of defining code executable by a database management system for performing cross-validation of the Naïve Bayes predictive model, executing the defined code so as to perform cross-validation of the Naïve Bayes predictive model, and outputting a an indication of the accuracy of the Naïve Bayes predictive model. The executing step may comprise the steps of receiving a training dataset comprising a plurality of rows of data, building a Naïve Bayes predictive model using the training dataset, for each of at least a portion of the plurality of rows of data in the training dataset, incrementally untraining the Naïve Bayes predictive model using the row of data, and determining an accuracy of the incrementally untrained Naïve Bayes predictive model, and determining an aggregate accuracy of the Naïve Bayes predictive model.

The step of building the Naïve Bayes predictive model using the training dataset may comprise the step of computing probabilities of target values based on counts of occurrences of target values in training dataset. The step of incrementally untraining the Naïve Bayes predictive model may comprise the steps of if a target value of the row of data equals a target value being computed, computing a probability of the target value based on a count of occurrence of the target value minus one and if the target value of the row of data does not equal the target value being computed, computing a probability of the target value based on the count of occurrence of the target value. The step of determining an accuracy of the incrementally untrained Naïve Bayes predictive model may comprise the steps of applying the incrementally untrained Naïve Bayes predictive model to the row of data to generate an output and determining an error between the model output and the row of data. The step of determining an aggregate accuracy of the Naïve Bayes predictive model may comprise the step of determining an average of the determined errors between the model output and the row of data.

In one embodiment of the present invention, a method for measuring accuracy of a Naïve Bayes predictive model comprises the steps of receiving a training dataset comprising a plurality of partitions of rows of data, building a Naïve Bayes predictive model using the training dataset, for each of at least a portion of the plurality of partitions of data in the training dataset, incrementally untraining the Naïve Bayes predictive model using rows of data in the partition, and determining an accuracy of the incrementally untrained Naïve Bayes predictive model, and determining an aggregate accuracy of the Naïve Bayes predictive model. The step of building the Naïve Bayes predictive model using the training dataset may comprise the step of computing probabilities of target values based on counts of occurrences of target values in training dataset. The step of incrementally untraining the Naïve Bayes predictive model may comprise the steps of if a target value of a row of data in the partition equals a target value being computed, computing a probability of the target value based on a count of occurrence of the target value minus one, and if the target value of the row of data in the partition does not equal the target value being computed, computing a probability of the target value based on the count of occurrence of the target value. The step of determining an accuracy of the incrementally untrained Naïve Bayes predictive model may comprise the steps of applying the incrementally untrained Naïve Bayes predictive model to the row of data to generate an output, and determining an error between the model output and the row of data. The step of determining an aggregate accuracy of the Naïve Bayes predictive model may comprise the step of determining an average of the determined errors between the model output and the row of data.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
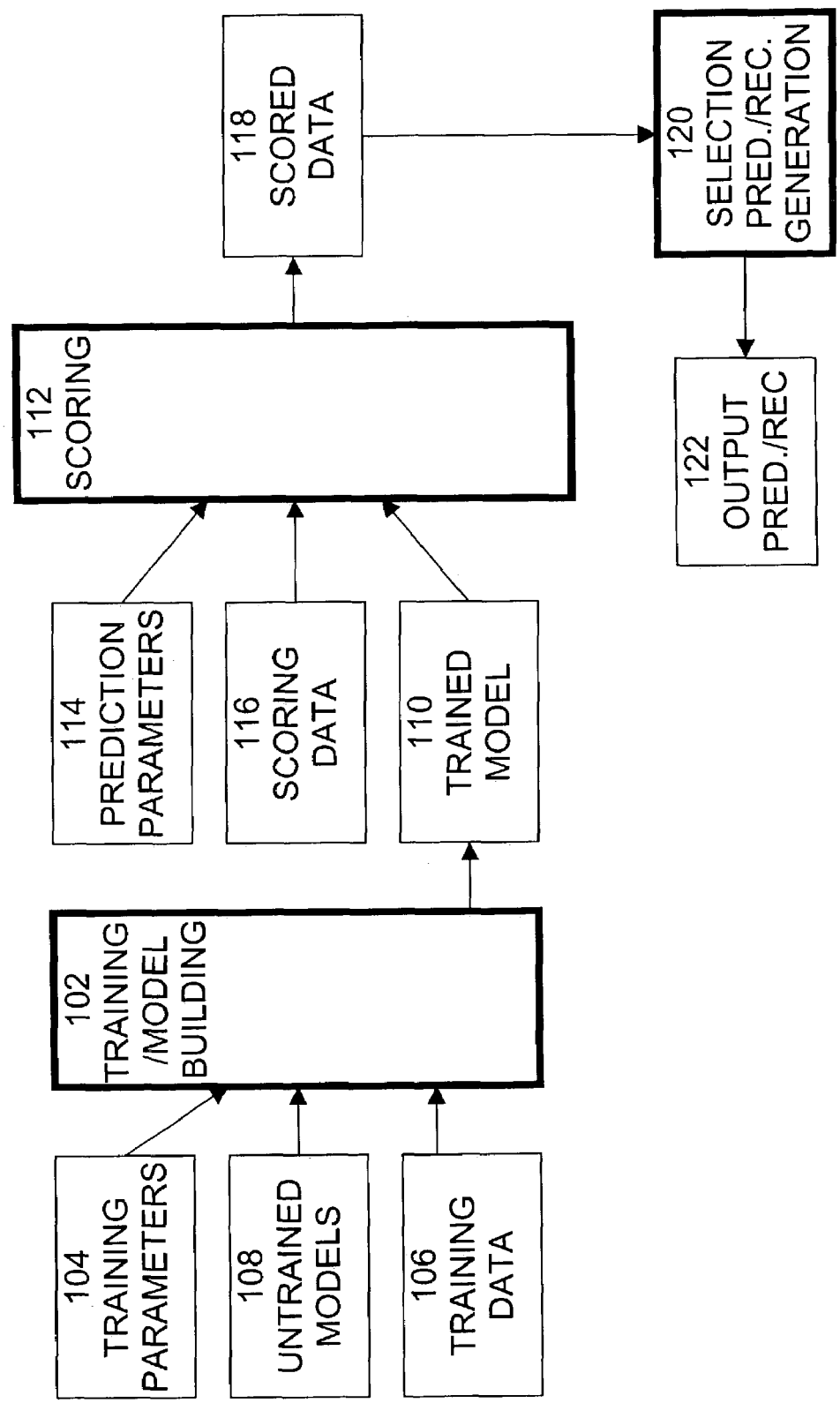
FIG. 1 is an exemplary data flow diagram of a data mining process, including building and scoring of models and generation of predictions/recommendations.

An exemplary data flow diagram of a data mining process, including building and scoring of models and generation of predictions/recommendations, is shown in FIG. 1. The training/model building step 102 involves generating the models that are used to perform data mining recommendation and prediction. The inputs to training/model building step 102 include training parameters 104, training data 106, and untrained models 108. Untrained models 108 include algorithms that process the training data 106 in order to actually build the models. Training parameters 104 are parameters that are input to the data-mining model building algorithms to control how the algorithms build the models. Training data 106 is data that is input to the algorithms and which is used to actually build the models.

Training/model building step 102 invokes the data mining model building algorithms included in untrained models 108, initializes the algorithms using the training parameters 104, processes training data 106 using the algorithms to build the model, and generates trained model 110. Trained model 110 may also be evaluated and adjusted in order to improve the quality, i.e. prediction accuracy, of the model. Trained model 110 is then encoded in an appropriate format and deployed for use in making predictions or recommendations.

Scoring step 112 involves using the deployed trained model 110 to make predictions or recommendations based on new data that is received. Trained model 110, prediction parameters 114, and prediction data 116 are input to scoring step 112. Trained models 110 include information defining the model that was generated by model building step 102. Prediction parameters 114 are parameters that are input to the scoring step 118 to control the scoring of scoring data 116 against trained model 110 and are input to the selection and prediction/recommendation step 120 to control the selection of the scored data and the generation of predictions and recommendations Scoring data 116 is processed according trained model 110, as controlled by prediction parameters 114, to generate one or more scores for each row of data in scoring data 116. The scores for each row of data indicate how closely the row of data matches attributes of the model, how much confidence may be placed in the prediction, how likely each output prediction/recommendation to be true, and other statistical indicators. Scored data 118 is output from scoring step 112 and includes predictions or recommendations, along with corresponding probabilities for the scored data.

Scored data 118 is input to selection and prediction/recommendation generation step, which evaluates the probabilities associated with the predictions/recommendations and selects at least a portion of the predictions/recommendations. The selected predictions/recommendations are those having probabilities meeting the selection criteria. The selection criteria may be defined by desired results data and/or by predefined or default criteria included in selection/generation step 120. In addition, the selection criteria may include a limit on the number of predictions/recommendations that are to be selected, or may indicate that the predictions/recommendations are to be sorted based on their associated probabilities. The selected predictions/recommendations are output 122 from step 120 for use in data mining.

Figure 2:
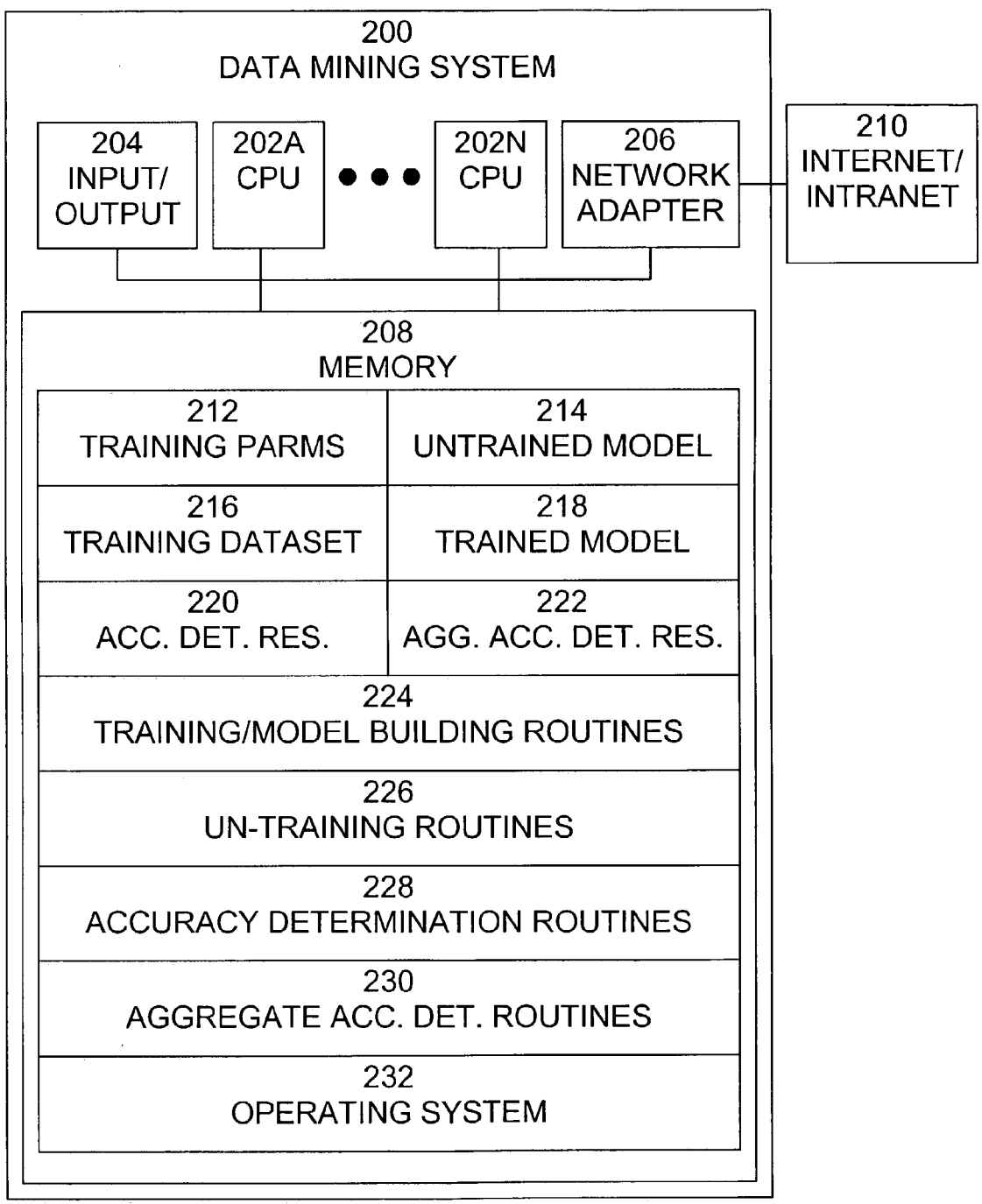
FIG. 2 is an exemplary block diagram of a data mining system, in which the present invention may be implemented.

An exemplary block diagram of a data mining system 200, in which the present invention may be implemented, is shown in FIG. 2. System 200 is typically a programmed general-purpose computer system, such as a personal computer, workstation, server system, and minicomputer or mainframe computer. System 200 includes one or more processors (CPUs) 202A-202N, input/output circuitry 204, network adapter 206, and memory 208. CPUs 202A-202N execute program instructions in order to carry out the functions of the present invention. Typically, CPUs 202A-202N are one or more microprocessors, such as an INTEL PENTIUM® processor. FIG. 2 illustrates an embodiment in which system 200 is implemented as a single multi-processor computer system, in which multiple processors 202A-202N share system resources, such as memory 208, input/output circuitry 204, and network adapter 206. However, the present invention also contemplates embodiments in which system 200 is implemented as a plurality of networked computer systems, which may be single-processor computer systems, multi-processor computer systems, or a mix thereof.

Input/output circuitry 204 provides the capability to input data to, or output data from, system 200. For example, input/output circuitry may include input devices, such as keyboards, mice, touchpads, trackballs, scanners, etc., output devices, such as video adapters, monitors, printers, etc., and input/output devices, such as, modems, etc. Network adapter 206 interfaces system 200 with Internet/intranet 210. Internet/intranet 210 may include one or more standard local area network (LAN) or wide area network (WAN), such as Ethernet, Token Ring, the Internet, or a private or proprietary LAN/WAN.

Memory 208 stores program instructions that are executed by, and data that are used and processed by, CPU 202 to perform the functions of system 200. Memory 208 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 2, memory 208 includes training parameters 212, untrained Naïve Bayes model 214, training dataset 216, trained model 218, accuracy determination results 220, training/model building routines 224, untraining routines 226, accuracy determination routines 228, aggregate accuracy determination routines 230, and operating system 232. Training parameters 212 are parameters that are input to the data-mining model building algorithms to control how the algorithms build the models. Untrained model 214 includes one or more untrained Naïve Bayes models that are used to build the models. Training dataset 216 includes data that is input to the algorithms and which is used to actually build the models. Trained model 218 includes representations of the Naïve Bayes model that are used to score data. Accuracy determination results 220 include entries, each representing the accuracy of the incrementally untrained model using a row of data from training dataset 216 as determined by accuracy determination routines 228. Aggregate accuracy determination results 222 is an aggregate indicator of the accuracy of trained model 218, which is generated from accuracy determination results 220 by aggregate accuracy determination routines 230. Training/ model building routines 224 build the trained model using untrained model 214, training parameters 212, and training data 216. Untraining routines incrementally untrain trained model 218 for each set of rows of data in training dataset 216. Accuracy determination routines 228 determine the accuracy of the incrementally untrained model for each set of rows of data from training dataset 216. Aggregate accuracy determination routines 230 generate aggregate accuracy determination result 222. Operating system 226 provides overall system functionality.

As shown in FIG. 2, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The most straightforward way to determine accuracy is to build a model using a portion of the available training data, and compute the model's error rate when applied to the remainder of the data. If the same data were used both for building the model and for scoring, the model would be given an unfair advantage that would artificially inflate its apparent accuracy. When working with a limited amount of training data, however, setting aside enough data to support an accurate scoring measure might seriously detract from the quality of the model, which generally improves as more data is available. Cross-validation is a way to mitigate this problem.

With leave-n-out cross-validation, the training data is divided into n partitions, each containing approximately 1/n of the data's records. Next, n models are built; for each model, all but one of the partitions are used for training, and the remaining one is used for scoring the model's accuracy. Typically, the accuracy measures are then averaged together.

Leave-one-out cross-validation is a special case of leave-n-out cross-validation. In leave-one-out cross-validation, the number of partitions is equal to the number of training records, and each partition consists of a single record. Thus, the number of models equals the number of training records, with each model being built from almost all the training data. Building so many models is computationally expensive. But with Naive Bayes models, there is a shortcut: it is possible to build a single model, using all the training data, and then quickly modify the model to make it as though a particular record had not been used when building the model. This process can be called "incrementally untraining" the model for that record. By measuring the model's accuracy on each training record, first temporarily incrementally untraining the model for that record, we obtain the same result as by building many models, but without incurring the greatly multiplied expense of actually building them.

Naive Bayes uses Bayes' Theorem, combined with a ("naive") presumption of conditional independence, to predict, for each record (a set of values, one for each field), the value of a target (output) field, from evidence given by one or more predictor (input) fields.

Given target field T with possible values T1, ... Tm, and predictor fields I1, ... In, with values (in the current record) of I1*, ... In*, the probability that the target T has value $T_i$, given the values of the predictors, is derived as follows:

$P(T_i|I_{1^*}, \ldots I_{n^*})$ $= P(T_i)P(I_{1^*}, \ldots I_{n^*}|T_i)/P(I_{1^*}, \ldots I_{n^*})$, by Bayes' theorem $\sim P(T_i)?_j P(I_{j^*}|T_i)/P(I_{1^*}, \ldots I_{n^*})$, by the conditional independence assumption $= P(T_i)?_j P(I_{j^*}|T_i)/S_k(P(T_k)?_j P(I_{j^*}|T_k))$ $= L_i/S_k L_k$, defining likelihood $L_k = P(T_k)?_j P(I_{j^*}|T_k)$ $L_i$ $= P(T_i)?_j P(I_{j^*}|T_i)$ $= (\text{count}[T_i]/S_k \text{count}[T_k])?_j(\text{count}[I_{j^*} T_i]/S_k \text{ count}[T_k])/$ $(\text{count}[T_i]/S_k \text{ count}[T_k]) \sim \text{count}[T_i]?_j(\text{count}[I_{j^*} T_i]/$ $\text{count}[T_i])$, removing factors of $S_k \text{count}[T_k]$ common to all $L$ Thus, the probability of each target value is straightforwardly computed by multiplying and dividing several counts; these counts are part of the Naive Bayes model itself. Incremental untraining in support of leave-one-out cross-validation is accomplished simply by multiplying or dividing by one less than the specified count (provided that the current training record's target value equals the value whose probability is being computed; otherwise, the specified count is used without modification). Likewise, incremental untraining in support of leave-n-out cross-validation is accomplished simply by multiplying or dividing by n less than the specified count (provided that the current training record's target value equals the value whose probability is being computed; otherwise, the specified count is used without modification).

Figure 3:
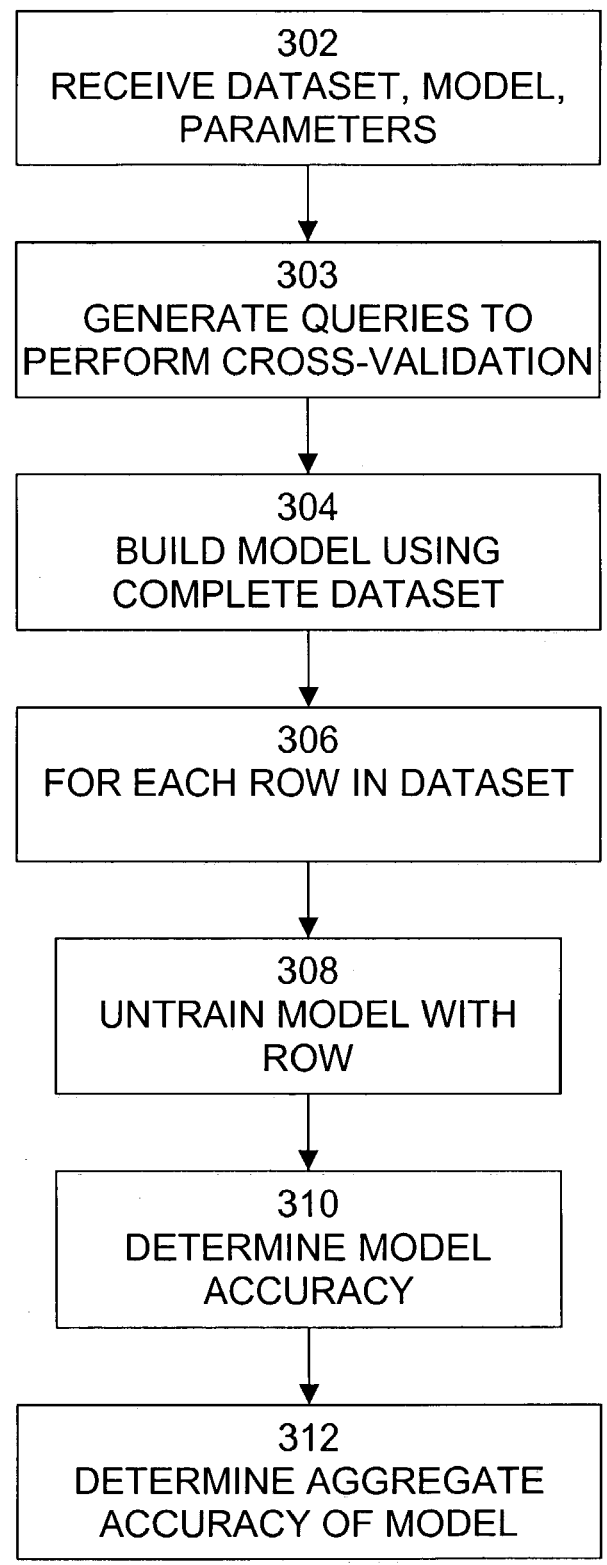
FIG. 3 is an exemplary flow diagram of a process of leave-one-out cross-validation of a Naïve Bayes model, according to the present invention.
Figure 4:
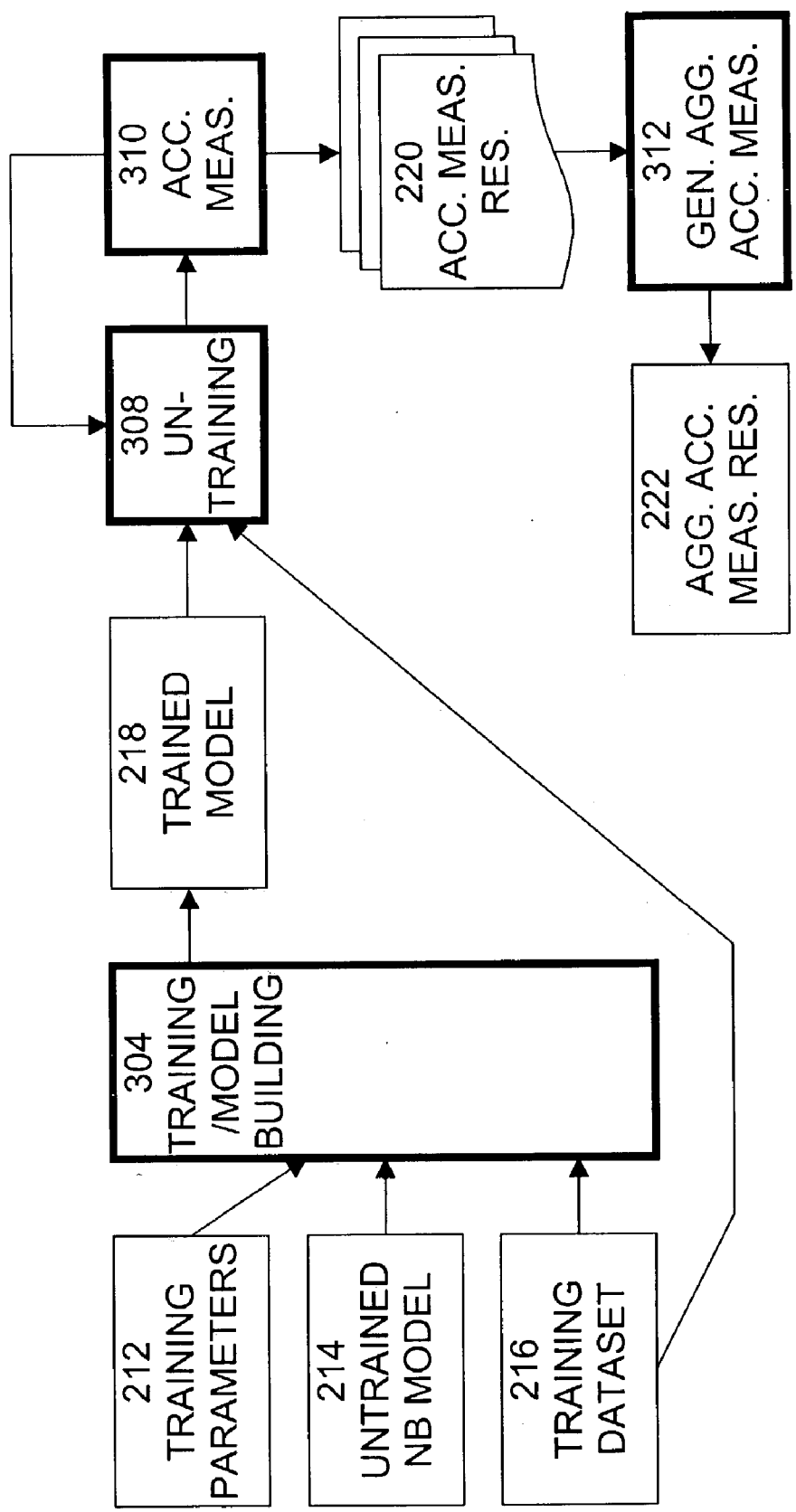
FIG. 4 is an exemplary data flow diagram of the processing shown in FIG. 3 and FIG. 5.

An exemplary flow diagram of a process 300 of leave-n-out cross-validation of a Naïve Bayes model is shown in FIG. 3. It is best viewed in conjunction with FIG. 2 and with FIG. 4, which is an exemplary data flow diagram of the processing performed by process 300. The process begins with step 302, in which training parameters 212, untrained Naïve Bayes model 214, and training dataset 216 are received and/or specified. Untrained Naïve Bayes model 214 includes algorithms that process the training data 216 in order to actually build the model. Training parameters 212 are parameters that are input to the data-mining model building algorithms to control how the algorithms build the models. Training data 216 is data that is input to the algorithms and which is used to actually build the models.

In step 303, in a preferred embodiment of the present invention, database queries that perform the leave-n-out cross-validation of steps 504-512 are generated based on the received and/or specified training parameters 212, untrained Naïve Bayes model 214, and training dataset 216. The database queries may be generated in any query language that can be understood by the selected database management system, but typically, Structured Query Language (SQL) is used.

In step 304, the data mining model building algorithms included in untrained Naïve Bayes model 214 are invoked by training/model building routines 224. The algorithms are initialized using the training parameters 212, training data 216 is processed using the algorithms to build the model, and trained model 218 is generated.

In step 306, for each row of data in training dataset 216, steps 308 and 310 are performed. In step 308, trained model 218 is incrementally untrained for the row of data from training dataset 216 that is currently being processed by untraining routines 226. In step 310, the accuracy of the incrementally untrained model is determined using the row of data from training dataset 216 that is currently being processed by accuracy determination routines 228. In particular, the model is applied to the current row of data and the error between the model output and the row of data is determined. The output of the accuracy determination of step 310 is one entry in accuracy determination results 220.

When all rows in training dataset 216 have been processed in steps 308 and 310, and entries in accuracy determination results 220 generated for each such row, then in step 312, aggregate accuracy determination result 222, which is an aggregate indicator of the accuracy of trained model 218, is generated from accuracy determination results 220 by aggregate accuracy determination routines 230. Typically, the aggregate accuracy determination result 222 is determined by averaging the individual accuracy determination results 220, but the present invention also contemplates other methods of determining aggregate accuracy.

Figure 5:
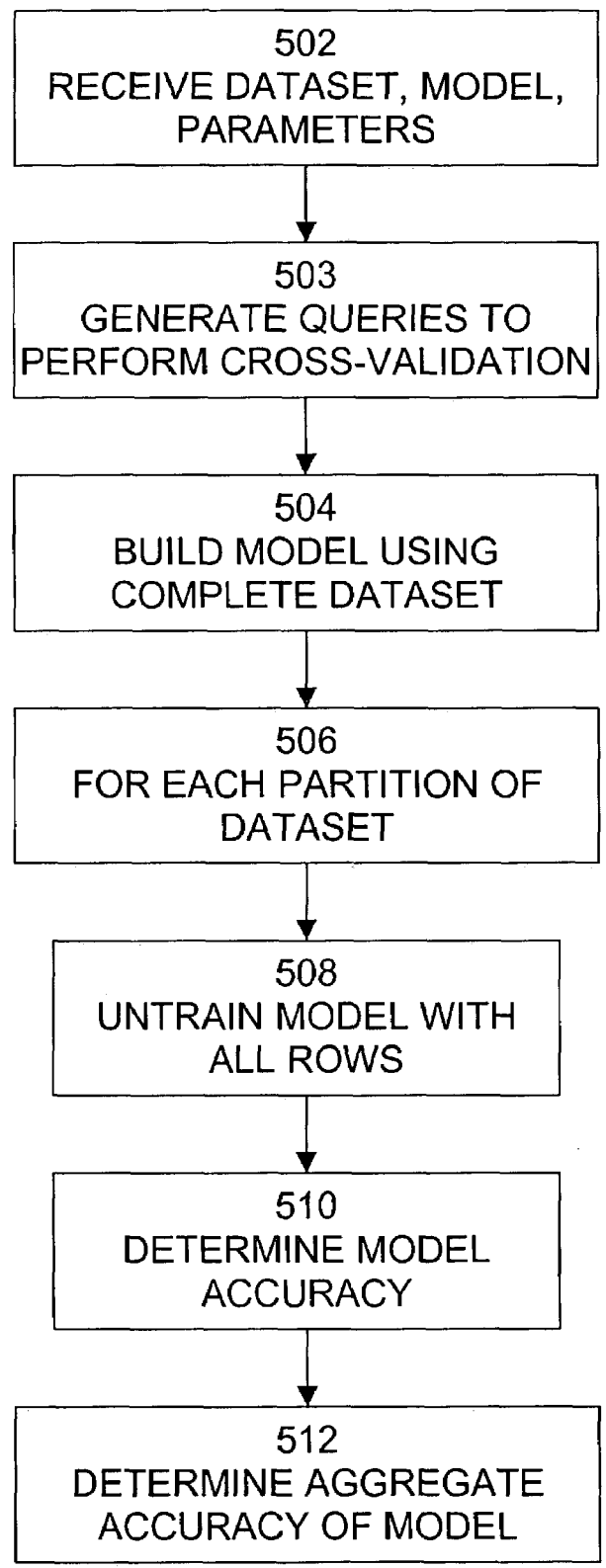
FIG. 5 is an exemplary flow diagram of a process of n-fold cross-validation of a Naïve Bayes model, according to the present invention.

An exemplary flow diagram of a process 500 of leave-n-out cross-validation of a Naïve Bayes model is shown in FIG. 5. It is best viewed in conjunction with FIG. 2 and with FIG. 4, which is also an exemplary data flow diagram of the processing performed by process 500. The process begins with step 502, in which training parameters 212, untrained Naïve Bayes model 214, and training dataset 216 are received and/or specified. Untrained Naïve Bayes model 214 includes algorithms that process the training data 216 in order to actually build the model. Training parameters 212 are parameters that are input to the data-mining model building algorithms to control how the algorithms build the models. Training data 216 is data that is input to the algorithms and which is used to actually build the models.

In step 503, in a preferred embodiment of the present invention, database queries that perform the leave-n-out cross-validation of steps 504-512 are generated based on the received and/or specified training parameters 212, untrained Naïve Bayes model 214, and training dataset 216. The database queries may be generated in any query language that can be understood by the selected database management system, but typically, Structured Query Language (SQL) is used.

In step 504, the data mining model building algorithms included in untrained Naïve Bayes model 214 are invoked by training/model building routines 224. The algorithms are initialized using the training parameters 212, training data 216 is processed using the algorithms to build the model, and trained model 218 is generated.

In step 506, for each partition of the data in training dataset 216, steps 508 and 510 are performed. In step 508, trained model 218 is incrementally untrained for each row of data in the partition of training dataset 216 that is currently being processed by untraining routines 226. This cumulatively modifies the model based on all rows in the partition. In step 510, the accuracy of the incrementally untrained model is determined using the partition of data from training dataset 216 that is currently being processed by accuracy determination routines 228. In particular, the model is applied to the rows of data in the partition and the error between the model output and the rows of data is determined. The output of the accuracy determination of step 510 is one entry in accuracy determination results 220.

When all partitions in training dataset 216 have been processed in steps 508 and 510, and entries in accuracy determination results 220 generated for each such partition, then in step 512, aggregate accuracy determination result 222, which is an aggregate indicator of the accuracy of trained model 218, is generated from accuracy determination results 220 by aggregate accuracy determination routines 230. Typically, the aggregate accuracy determination result 222 is determined by averaging the individual accuracy determination results 220, but the present invention also contemplates other methods of determining aggregate accuracy.

Thus, the model (or a copy thereof) is trained once and untrained once for each training record, merely doubling the amount of work, instead of requiring n times as much work to build n models conventionally.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for measuring accuracy of a Naïve Bayes predictive model for creating a recommendation or prediction of a tangible result comprising the steps of:
    defining code executable by a database management system for performing cross-validation by incremental untraining of the Naïve Bayes predictive model;
    executing the defined code so as to perform cross-validation of the Naïve Bayes predictive model;
    outputting an indication of the accuracy of the Naïve Bayes predictive model; and
    creating a recommendation or prediction of a tangible result using the Naïve Bayes predictive model.

2. The method of claim 1, wherein the executing step comprises the steps of:
    receiving a training dataset comprising a plurality of rows of data;
    building a Naïve Bayes predictive model using the training dataset;
    for each of at least a portion of the plurality of rows of data in the training dataset:
    incrementally untraining the Naïve Bayes predictive model using the row of data, and
    determining an accuracy of the incrementally untrained Naïve Bayes predictive model; and
    determining an aggregate accuracy of the Naïve Bayes predictive model.

3. The method of claim 2, wherein the step of building the Naïve Bayes predictive model using the training dataset comprises the step of:
    computing probabilities of target values based on counts of occurrences of target values in training dataset.

4. The method of claim 3, wherein the step of incrementally untraining the Naïve Bayes predictive model comprises the steps of:
    if a target value of the row of data equals a target value being computed, computing a probability of the target value based on a count of occurrence of the target value minus one; and
    if the target value of the row of data does not equal the target value being computed, computing a probability of the target value based on the count of occurrence of the target value.

5. The method of claim 4, wherein the step of determining an accuracy of the incrementally untrained Naïve Bayes predictive model comprises the steps of:
    applying the incrementally untrained Naïve Bayes predictive model to the row of data to generate an output; and
    determining an error between the model output and the row of data.

6. The method of claim 5, wherein the step of determining an aggregate accuracy of the Naïve Bayes predictive model comprises the step of:
    determining an average of the determined errors between the model output and the row of data.

7. A system for measuring accuracy of a Naïve Bayes predictive model for creating a recommendation or prediction of a tangible result comprising:
    a processor operable to execute computer program instructions;
    a memory operable to store computer program instructions executable by the processor; and
    computer program instructions stored in the memory and executable to perform the steps of:
    defining code executable by a database management system for performing cross-validation by incremental untraining of the Naïve Bayes predictive model;
    executing the defined code so as to perform cross-validation of the Naïve Bayes predictive model;
    outputting an indication of the accuracy of the Naïve Bayes predictive model; and
    creating a recommendation or prediction of a tangible result using the Naïve Bayes predictive model.

8. The system of claim 7, wherein the executing step comprises the steps of:
    receiving a training dataset comprising a plurality of rows of data;
    building a Naïve Bayes predictive model using the training dataset;
    for each of at least a portion of the plurality of rows of data in the training dataset:
    incrementally untraining the Naïve Bayes predictive model using the row of data, and
    determining an accuracy of the incrementally untrained Naïve Bayes predictive model; and
    determining an aggregate accuracy of the Naïve Bayes predictive model.

9. The system of claim 8, wherein the step of building the Naïve Bayes predictive model using the training dataset comprises the step of:
    computing probabilities of target values based on counts of occurrences of target values in training dataset.

10. The system of claim 9, wherein the step of incrementally untraining the Naïve Bayes predictive model comprises the steps of:
    if a target value of the row of data equals a target value being computed, computing a probability of the target value based on a count of occurrence of the target value minus one; and
    if the target value of the row of data does not equal the target value being computed, computing a probability of the target value based on the count of occurrence of the target value.

11. The system of claim 10, wherein the step of determining an accuracy of the incrementally untrained Naïve Bayes predictive model comprises the steps of:
    applying the incrementally untrained Naïve Bayes predictive model to the row of data to generate an output; and
    determining an error between the model output and the row of data.

12. The system of claim 11, wherein the step of determining an aggregate accuracy of the Naïve Bayes predictive model comprises the step of:
    determining an average of the determined errors between the model output and the row of data.

13. A computer program product for measuring accuracy of a Naïve Bayes predictive model for creating a recommendation or prediction of a tangible result comprising:
    a computer readable medium;
    computer program instructions, recorded on the computer readable medium, executable by a processor, for performing the steps of:
    defining code executable by a database management system for performing cross-validation by incremental untraining of the Naïve Bayes predictive model;

executing the defined code so as to perform cross-validation of the Naïve Bayes predictive model;
outputting an indication of the accuracy of the Naïve Bayes predictive model; and
creating a recommendation or prediction of a tangible result using the Naïve Bayes predictive model.

14. The computer program product of claim 13, wherein the executing step comprises the steps of:
receiving a training dataset comprising a plurality of rows of data;
building a Naïve Bayes predictive model using the training dataset;
for each of at least a portion of the plurality of rows of data in the training dataset:
incrementally untraining the Naïve Bayes predictive model using the row of data, and
determining an accuracy of the incrementally untrained Naïve Bayes predictive model; and
determining an aggregate accuracy of the Naïve Bayes predictive model.

15. The computer program product of claim 14, wherein the step of building the Naïve Bayes predictive model using the training dataset comprises the step of:
computing probabilities of target values based on counts of occurrences of target values in training dataset.

16. The computer program product of claim 15, wherein the step of incrementally untraining the Naïve Bayes predictive model comprises the steps of:
if a target value of the row of data equals a target value being computed, computing a probability of the target value based on a count of occurrence of the target value minus one; and
if the target value of the row of data does not equal the target value being computed, computing a probability of the target value based on the count of occurrence of the target value.

17. The computer program product of claim 16, wherein the step of determining an accuracy of the incrementally untrained Naïve Bayes predictive model comprises the steps of:
applying the incrementally untrained Naïve Bayes predictive model to the row of data to generate an output; and
determining an error between the model output and the row of data.

18. The computer program product of claim 17, wherein the step of determining an aggregate accuracy of the Naïve Bayes predictive model comprises the step of:
determining an average of the determined errors between the model output and the row of data.

19. A method for measuring accuracy of a Naïve Bayes predictive model for creating a recommendation or prediction of a tangible result comprising the steps of:
receiving a training dataset comprising a plurality of partitions of rows of data;
building a Naïve Bayes predictive model using the training dataset;
for each of at least a portion of the plurality of partitions of data in the training dataset:
incrementally untraining the Naïve Bayes predictive model using rows of data in the partition, and
determining an accuracy of the incrementally untrained Naïve Bayes predictive model;
determining an aggregate accuracy of the Naïve Bayes predictive model; and
creating a recommendation or prediction of a tangible result using the Naïve Bayes predictive model.

20. The method of claim 19, wherein the step of building the Naïve Bayes predictive model using the training dataset comprises the step of:
computing probabilities of target values based on counts of occurrences of target values in training dataset.

21. The method of claim 20, wherein the step of incrementally untraining the Naïve Bayes predictive model comprises the steps of:
if a target value of a row of data in the partition equals a target value being computed, computing a probability of the target value based on a count of occurrence of the target value minus one; and
if the target value of the row of data in the partition does not equal the target value being computed, computing a probability of the target value based on the count of occurrence of the target value.

22. The method of claim 21, wherein the step of determining an accuracy of the incrementally untrained Naïve Bayes predictive model comprises the steps of:
applying the incrementally untrained Naïve Bayes predictive model to the row of data to generate an output; and
determining an error between the model output and the row of data.

23. The method of claim 22, wherein the step of determining an aggregate accuracy of the Naïve Bayes predictive model comprises the step of:
determining an average of the determined errors between the model output and the row of data.

24. A system for measuring accuracy of a Naïve Bayes predictive for creating a recommendation or prediction of a tangible result model comprising:
a processor operable to execute computer program instructions;
a memory operable to store computer program instructions executable by the processor; and
computer program instructions stored in the memory and executable to perform the steps of:
receiving a training dataset comprising a plurality of partitions of rows of data;
building a Naïve Bayes predictive model using the training dataset;
for each of at least a portion of the plurality of partitions of data in the training dataset:
incrementally untraining the Naïve Bayes predictive model using rows of data in the partition, and
determining an accuracy of the incrementally untrained Naïve Bayes predictive model;
determining an aggregate accuracy of the Naïve Bayes predictive model; and
creating a recommendation or prediction of a tangible result using the Naïve Bayes predictive model.

25. The system of claim 24, wherein the step of building the Naïve Bayes predictive model using the training dataset comprises the step of:
computing probabilities of target values based on counts of occurrences of target values in training dataset.

26. The system of claim 25, wherein the step of incrementally untraining the Naïve Bayes predictive model comprises the steps of:
if a target value of a row of data in the partition equals a target value being computed, computing a probability of the target value based on a count of occurrence of the target value minus one; and
if the target value of the row of data in the partition does not equal the target value being computed, computing a probability of the target value based on the count of occurrence of the target value.

27. The system of claim 26, wherein the step of determining an accuracy of the incrementally untrained Naïve Bayes predictive model comprises the steps of:
applying the incrementally untrained Naïve Bayes predictive model to the row of data to generate an output; and
determining an error between the model output and the row of data.

28. The system of claim 27, wherein the step of determining an aggregate accuracy of the Naïve Bayes predictive model comprises the step of:
determining an average of the determined errors between the model output and the row of data.

29. A computer program product for measuring accuracy of a Naïve Bayes predictive model for creating a recommendation or prediction of a tangible result comprising:
a computer readable storage medium;
computer program instructions, recorded on the computer readable medium, executable by a processor, for performing the steps of:
receiving a training dataset comprising a plurality of partitions of rows of data;
building a Naïve Bayes predictive model using the training dataset;
for each of at least a portion of the plurality of partitions of data in the training dataset:
incrementally untraining the Naïve Bayes predictive model using rows of data in the partition, and
determining an accuracy of the incrementally untrained Naïve Bayes predictive model;
determining an aggregate accuracy of the Naïve Bayes predictive model; and
creating a recommendation or prediction of a tangible result using the Naïve Bayes predictive model.

30. The computer program product of claim 29, wherein the step of building the Naïve Bayes predictive model using the training dataset comprises the step of:
computing probabilities of target values based on counts of occurrences of target values in training dataset.

31. The computer program product of claim 30, wherein the step of incrementally untraining the Naïve Bayes predictive model comprises the steps of:
if a target value of a row of data in the partition equals a target value being computed, computing a probability of the target value based on a count of occurrence of the target value minus one; and
if the target value of the row of data in the partition does not equal the target value being computed, computing a probability of the target value based on the count of occurrence of the target value.

32. The computer program product of claim 31, wherein the step of determining an accuracy of the incrementally untrained Naïve Bayes predictive model comprises the steps of:
applying the incrementally untrained Naïve Bayes predictive model to the row of data to generate an output; and
determining an error between the model output and the row of data.

33. The computer program product of claim 32, wherein the step of determining an aggregate accuracy of the Naïve Bayes predictive model comprises the step of:
determining an average of the determined errors between the model output and the row of data.

* * * * *

UNITED STATES PATENT AND TRADEMARK OFFICE
CERTIFICATE OF CORRECTION

PATENT NO. : 7,299,215 B2 Page 1 of 1
APPLICATION NO. : 10/419761
DATED : November 20, 2007
INVENTOR(S) : Drescher et al.

It is certified that error appears in the above-identified patent and that said Letters Patent is hereby corrected as shown below:

In column 3, line 59, after "recommendations" insert -- . --.

In column 4, line 57, delete "electromechanical" and insert -- electro-mechanical --, therefor.

Signed and Sealed this

Fourteenth Day of October, 2008

JON W. DUDAS
*Director of the United States Patent and Trademark Office*